(12) United States Patent
Sun et al.

(10) Patent No.: US 12,208,345 B2
(45) Date of Patent: Jan. 28, 2025

(54) LARGE-FLUX ULTRA-FINE GRID SYSTEM WITH NON-ROTATING SCREEN PLATES

(71) Applicant: North China Municipal Engineering Design & Research Institute Co., Ltd., Tianjin (CN)

(72) Inventors: Yongli Sun, Tianjin (CN); Pengfeng Li, Tianjin (CN); Min Yang, Tianjin (CN); Kejian Sui, Tianjin (CN); Yaxiong Wang, Tianjin (CN); Jiaju Li, Tianjin (CN); Wei Zhang, Tianjin (CN)

(73) Assignee: North China Municipal Engineering Design & Research Institute Co., Ltd., Tianjin (CN)

( * ) Notice: Subject to any disclaimer, the term of this patent is extended or adjusted under 35 U.S.C. 154(b) by 0 days.

(21) Appl. No.: 18/786,770

(22) Filed: Jul. 29, 2024

(65) Prior Publication Data

US 2024/0382874 A1      Nov. 21, 2024

(30) Foreign Application Priority Data

Sep. 12, 2023 (CN) .......................... 202311167296.1

(51) Int. Cl.
B01D 21/00     (2006.01)
B01D 21/20     (2006.01)
B01D 21/24     (2006.01)

(52) U.S. Cl.
CPC ......... *B01D 21/0012* (2013.01); *B01D 21/20* (2013.01); *B01D 21/2411* (2013.01); *B01D 21/2433* (2013.01)

(58) Field of Classification Search
None
See application file for complete search history.

(56) References Cited

FOREIGN PATENT DOCUMENTS

| CN | 213117905 U | 5/2021 |
|---|---|---|
| CN | 214552391 U | 11/2021 |
| CN | 217909361 U | 11/2022 |

*Primary Examiner* — Krishnan S Menon
(74) *Attorney, Agent, or Firm* — IPRO, PLLC

(57) ABSTRACT

The present disclosure provides a grid system, including a grid body and supports, where the grid body includes a water intake module, a filtering module, a residue scraping module, a residue pressing module, and a water discharge module; the filtering module is disposed at a middle-upper part of the grid body, the water intake module and the residue pressing module are organically coupled at a lower part of the filtering module, and the water intake module includes a water inlet and a water distribution area; the filtering module includes a water retaining platform, an inflow water guide plate, screen plate areas, and a central water retaining weir; the residue scraping module includes scrapers, a driving motor, a support frame, a residue inlet, and a guide rail; the residue pressing module includes a squeezing cylinder, a motor, and a residue outlet.

9 Claims, 2 Drawing Sheets

LARGE-FLUX ULTRA-FINE GRID SYSTEM WITH NON-ROTATING SCREEN PLATES

TECHNICAL FIELD

The present disclosure belongs to the technical field of water treatment equipment, and specifically relates to a large-flux ultra-fine grid system with non-rotating screen plates.

BACKGROUND

Grids are important pretreatment equipment in the drainage industry. Their main function is to remove impurities such as floating debris and fine particles from wastewater. They are generally divided into coarse grids, fine grids and ultra-fine grids according to the spacing of the grids, which play an important role in ensuring the stable operation of a subsequent biological treatment system, especially the (ultra-) fine grids. Currently, (ultra-) fine grids that are widely applied to urban sewage treatment mainly include mainstream products such as drum grids, internal inflow grids, and stepped screen plate grids. However, it has been found from long-term follow-up research that the above-mentioned mainstream grid products have many problems in practical engineering applications, such as grid residue penetration, small effective filtration area (generally less than 25%), low filtration flux, grid plate deformation under long-term rotation, rotating shaft fracture, driving chain jammed, large backwashing water volume, and more support equipment (including a backwashing system, a liquid level gauge configuration, and the like).

Therefore, there is an urgent need to provide a novel ultra-fine grid system with non-rotating grid plates, which is high in filtration flux, and simple and convenient in operation and maintenance management, so as to solve the main problems of grid plate deformation due to rotation, small effective filtration area, more support equipment, relatively complex operation and maintenance, and the like in the practical applications of the existing fine grid systems.

SUMMARY

In order to overcome the shortcomings of the prior art, the present disclosure provides a large-flux ultra-fine grid system with non-rotating screen plates. The present disclosure can solve the main problems of grid plate deformation due to rotation, small effective filtration area, more support equipment, relatively complex operation and maintenance, and the like in the practical applications of the existing fine grid systems through the entirely new design of grid structures such as the non-rotating screen plates with slightly curved surfaces, rotating scrapers, and improved effective filtration area.

To achieve the above technical objective, the technical solutions adopted in the embodiments of the present disclosure are described below.

A large-flux ultra-fine grid system with non-rotating screen plates includes a grid body and supports, where the grid body includes a water intake module, a filtering module, a residue scraping module, a residue pressing module, and a water discharge module.

The filtering module is disposed at a middle-upper part of the grid body, the water intake module and the residue pressing module are organically coupled at a lower part of the filtering module, and the water intake module, the residue pressing module, the filtering module and the residue scraping module are located on a cylindrical barrel disposed on the grid body.

The water intake module includes a water inlet and a water distribution area.

The filtering module includes a water retaining platform, an inflow water guide plate, a first aperture screen plate area, a second aperture screen plate area, and a central water retaining weir located in a center of the filtering module.

The residue scraping module includes scrapers, a driving motor, a support frame, a residue inlet, and a guide rail.

The residue pressing module includes a squeezing cylinder, a motor, and a residue outlet.

The water distribution area is fitted to the lower part of the filtering module, a right side of the water distribution area is aligned with a left side of the first aperture screen plate area, a left side of the water distribution area is aligned with a right side of the water retaining platform, a left side of the water retaining platform is integrated with the guide rail, the second aperture screen plate area is formed between the first aperture screen plate area and the residue inlet, and the squeezing cylinder is connected to the residue inlet by ways of grid residue baffles on both sides.

The support frame is disposed on the supports, the driving motor is disposed on the support frame, and the scrapers are driven by the driving motor to rotate continuously.

The residue outlet is reserved at an outlet end of the squeezing cylinder, and the motor and the residue outlet are diagonally disposed on both sides of the cylindrical barrel.

The water discharge module is disposed at a lower part of the grid body and located on a conical barrel disposed on the grid body, and a water outlet is reserved in a bottom of the conical barrel.

Further, a left side of the inflow water guide plate is fixedly connected to an extension plate of the water retaining platform, the inflow water guide plate is disposed parallel to the first aperture screen plate area, and the inflow water guide plate is disposed at an angle of 5-10°.

Further, the filtering module is configured to arranged in a slightly curved surface, and the first aperture screen plate area and the second aperture screen plate area are both inclined downwards in the direction of the central water retaining weir, with an angle of 5-10° to the horizontal plane.

Further, the area of the second aperture screen plate area is 1-2 times of the first aperture screen plate area, the porosity of the first aperture screen plate area and the second aperture screen plate area is 80%-95%, the aperture range of the first aperture screen plate area is 2-4 mm, and the aperture range of the second aperture screen plate area is 0.2-2 mm.

Further, the first aperture screen plate area and the second aperture screen plate area have the same radius of 25-75 cm. The specific radius is comprehensively determined based on the inflow water flow rates, screen plate apertures, porosity, and water flux.

Further, an upper surface of the water retaining platform is 10-15 cm higher than an upper surface of the second aperture screen plate area located on the same circumference, and the area of the water retaining platform accounts for $\frac{1}{12}$-$\frac{1}{8}$ of the area of the filtering module.

Further, the scrapers are arranged on a rotating shaft of the driving motor in a manner of fan blade type combination, each of the scrapers includes a first layer structure and a second layer structure, where the height of the first layer structure is 30-40 cm, and an interstice between a tail end of the first layer structure and an inner wall of the grid body is 1-2 cm; and the height of the second layer structure is 15-20 cm, a tail end of the second layer structure is fitted to the inner wall of the grid body, and a bottom of the second layer structure is fitted to the upper surfaces of the first aperture screen plate area and the second aperture screen plate area.

Further, the scrapers continuously rotate in a counter-clockwise direction, and the rotating direction of the scrapers is the same as the movement direction of effluent from the water distribution area on the surfaces of the first aperture screen plate area and the second aperture screen plate area.

Further, the squeezing cylinder passes through a center of the cylindrical barrel, and the length of a horizontal portion of the squeezing cylinder is equal to the diameter of the cylindrical barrel.

Further, the water discharge module includes a conical catchment area and the water outlet, and the water outlet is reserved in a bottom of the conical catchment area.

The technical solutions provided by the embodiments of the present disclosure have the following beneficial effects.

1. The effective filtration area of the traditional ultra-fine grid generally accounts for less than 25%, and the core components, i.e., stainless steel filtration grid plates (screen plates) will rotate intermittently during the operation. However, through the entirely new design of grid structures, the fan-shaped first aperture screen plate area and second aperture screen plate area arranged with a slightly curved surface always remains stationary and non-rotating during grid operation, so that the effective filtration area accounts for 75% or more; and therefore, the effective filtration area proportion and the sewage filtration flux are significantly improved, which solves the problems of the traditional grid, such as low effective filtration area proportion, screen plate deformation due to rotation, and the requirement of a large driving power for rotating the screen plates.

2. The traditional ultra-fine grid generally realizes the removal of fine grid residue intercepted on the surfaces of the screen plates by frequently turning on a high-pressure backwashing device configured, while the present disclosure mainly uses the speed-regulating motor with low installed power to drive the continuous rotation of the scrapers arranged in a manner of fan blade type combination for achieving the mechanical removal of grid residue, which has the advantages of saving water, reducing power consumption, and the like.

3. According to the novel ultra-fine grid system provided by the present disclosure, the grid residue pressing module is organically integrated with the grid body as a whole, so that the ultra-fine grid system has the advantages of being simple in system structure, high in intensity, and easy to install, operate and maintain, saving equipment space, reducing project investment, and the like.

4. The present disclosure is highly targeted, practical and operable, and can be used in various application scenarios such as reconstruction and extension projects of urban sewage treatment plants, integrated domestic sewage treatment facilities in villages and towns, and rapid purification facilities for rainfall pollution.

Figure 1:
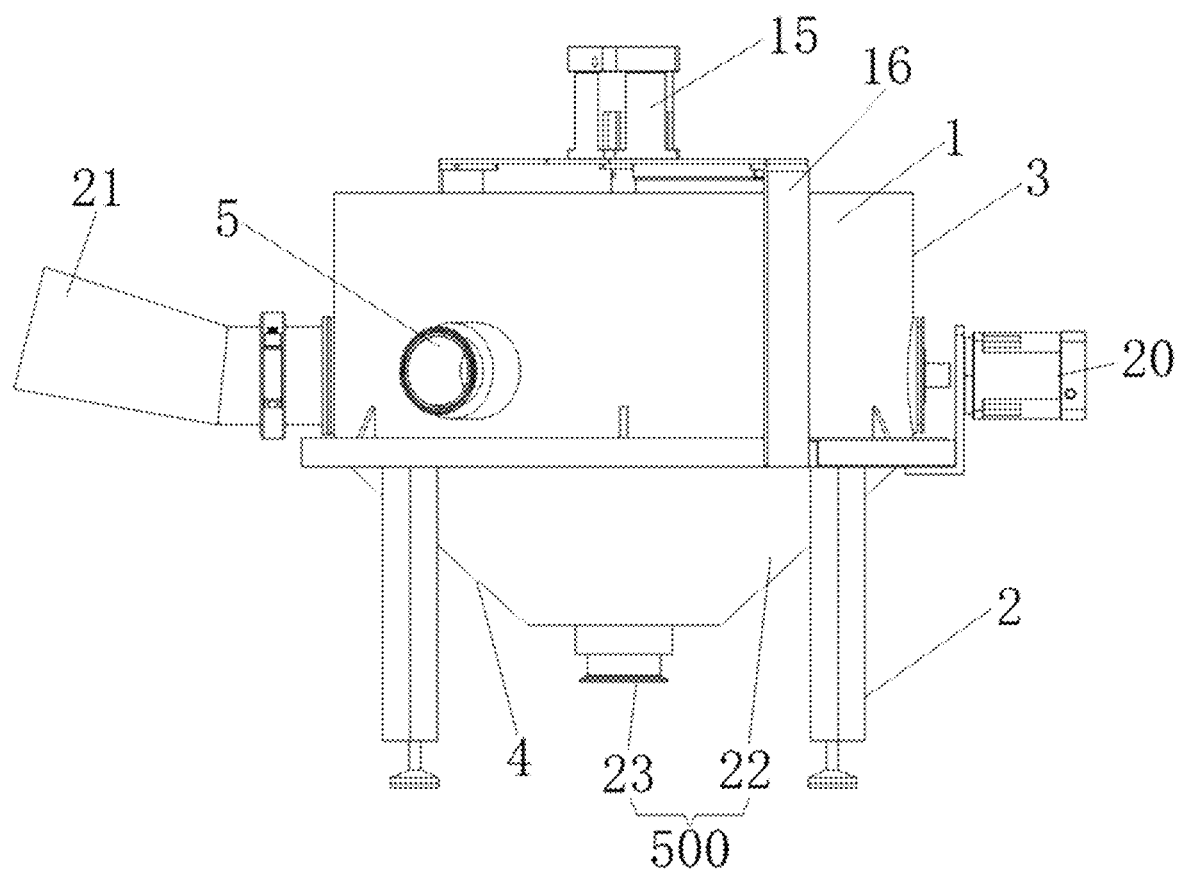
FIG. 1 is a schematic structural diagram a large-flux ultra-fine grid system with non-rotating screen plates in an embodiment of the present disclosure.

Description of reference numerals: 1 denotes a grid body; 2 denotes supports; 3 denotes a cylindrical barrel; 4 denotes a conical barrel; 5 denotes a water inlet; 6 denotes a water distribution area; 7 denotes a water retaining platform; 8 denotes an inflow water guide plate; 9 denotes a first aperture screen plate area; 10 denotes a second aperture screen plate area; 11 denotes a central water retaining weir; 12 denotes scrapers; 13 denotes a first layer structure; 14 denotes a second layer structure; 15 denotes a driving motor; 16 denotes a support frame; 17 denotes a residue inlet; 18 denotes a guide rail; 19 denotes a squeezing cylinder; 20 denotes a motor; 21 denotes a residue outlet; 22 denotes a conical catchment area; 23 denotes a water outlet; 100 denotes a water intake module; 200 denotes a filtering module; 300 denotes a residue scraping module; 400 denotes a residue pressing module; and 500 denotes a water discharge module.

DETAILED DESCRIPTION

In the description of the present disclosure, it should be understood that the orientations or positional relationships indicated by the directional terms such as "inner, outer", "upper, lower", "left, right", and the like are usually based on the orientations or positional relationships shown in the drawings, which is only for the convenience of describing the present disclosure and simplifying the description. Where the contrary is not stated, these directional terms do not indicate or imply that the device or element referred to must have a particular orientation or be constructed and operated in a particular orientation. Therefore, it should not be construed as limiting the scope of protection of the present disclosure.

In order to make the objectives, technical solutions and advantages of the present disclosure clearer, the present disclosure will be further described in detail below with reference to the accompanying drawings and embodiments. It should be understood that the specific embodiments described herein are only used to explain the present disclosure, and are not intended to limit the present disclosure.

Figure 2:
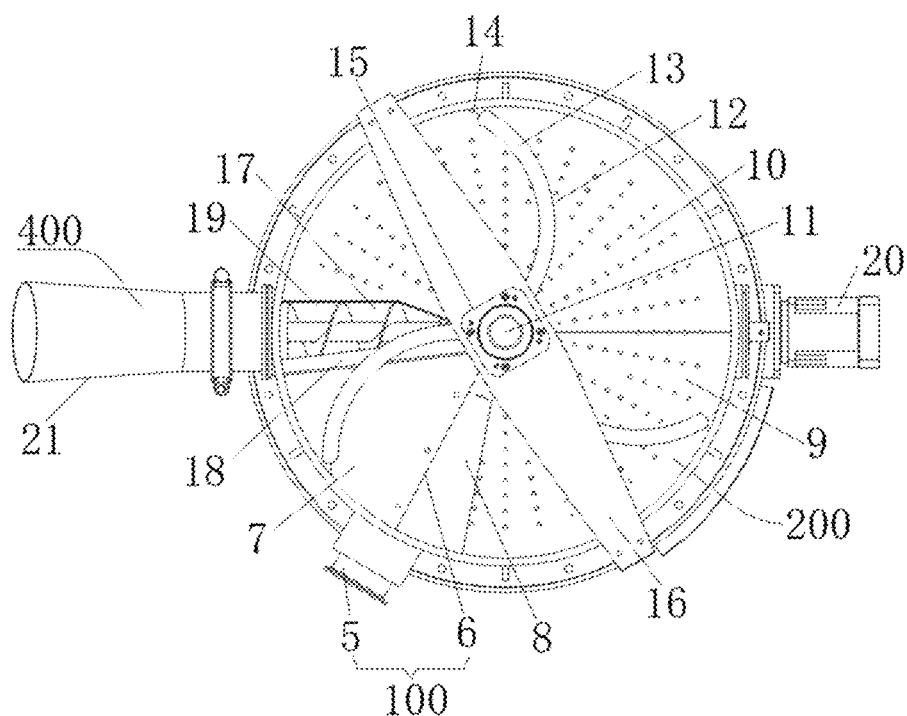
FIG. 2 is a top view of a large-flux ultra-fine grid system with non-rotating screen plates in an embodiment of the present disclosure.

As shown in FIG. 1 and FIG. 2, a large-flux ultra-fine grid system with non-rotating screen plates includes a grid body 1 and supports 2, and the grid body 1 includes a water intake module 100, a filtering module 200, a residue scraping module 300, a residue pressing module 400, and a water discharge module 500.

Figure 3:
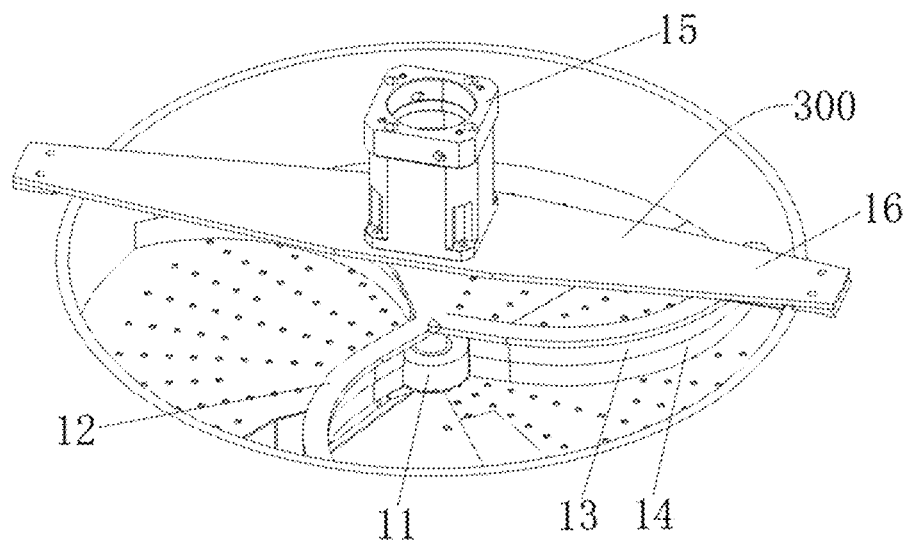
FIG. 3 is a detailed diagram of scrapers and a central water retaining weir of a large-flux ultra-fine grid system with non-rotating screen plates in an embodiment of the present disclosure.

As shown in FIG. 3, the filtering module 200 is disposed at a middle-upper part of the grid body 1, the water intake module 100 and the residue pressing module 400 are organically coupled at a lower part of the filtering module 200, the water intake module 100, the residue pressing module 400, the filtering module 200 and the residue scraping module 300 are located on a cylindrical barrel 3 disposed on the grid body 1, and the cylindrical barrel 3 is a cylindrical structure.

The water intake module 100 includes a water inlet 5 and a water distribution area 6, and the water distribution area 6 is fan-shaped.

The filtering module 200 includes a water retaining platform 7, an inflow water guide plate 8, a first aperture screen plate area 9, a second aperture screen plate area 10, and a central water retaining weir 11 located in a center of the filtering module 200, where the water retaining platform 7 is a platform for resisting water flow, the inflow water guide plate 8 is fan-shaped, the first aperture screen plate area 9 is an area provided with a plurality of first aperture screen plates, the second aperture screen plate area 10 is an area provided with a plurality of first aperture screen plates, the first aperture is a large aperture, and the second aperture is a small aperture; and the central water retaining weir 11 is a platform for resisting water flow, which is disposed in the middle of the grid body 1.

The residue scraping module 300 includes scrapers 12, a driving motor 15, a support frame 16, a residue inlet 17, and a guide rail 18, where the scrapers 12 are arc-shaped, and the driving motor 15 is a variable frequency speed-regulating driving motor; the support frame 16 is a support frame of the driving motor 15 for supporting the driving motor 15; and the guide rail 18 is a guide rail disposed obliquely in a sloping manner and serving for the scrapers 12.

The residue pressing module 400 includes a squeezing cylinder 19, a motor 20, and a residue outlet 21, where the squeezing cylinder 19 is a squeezing cylinder and internally provided with spiral blades, and the motor 20 is a variable frequency motor used for squeezing. The water distribution area 6 is fitted to the lower part of the filtering module 200, a right side of the water distribution area 6 is aligned with a left side of the first aperture screen plate area 9, a left side of the water distribution area 6 is aligned with a right side of the water retaining platform 7, a left side of the water retaining platform 7 is coupled and integrated with the guide rail 18, the second aperture screen plate area 10 is formed between the first aperture screen plate area 9 and the residue inlet 17, and the squeezing cylinder 19 is connected to the residue inlet 17 by ways of grid residue baffles on both sides.

The support frame 16 is disposed on the supports 2, the driving motor 15 is disposed on the support frame 16, the scrapers 12 are driven by the driving motor 15 to rotate continuously, and the supports 2 may be made of stainless steel.

The residue outlet 21 is reserved at an outlet end of the squeezing cylinder 19, and the motor 20 and the residue outlet 21 are diagonally disposed on both sides of the cylindrical barrel 3.

The water discharge module 500 is disposed at a lower part of the grid body 1 and located on a conical barrel 4 disposed on the grid body 1, and a water outlet 23 is reserved in a bottom of the conical barrel 4, where the conical barrel 4 has a conical structure and is connected to the cylindrical barrel 3, and the cylindrical barrel 3 is connected above the conical barrel 4.

As an implementation, the driving motor 15 is disposed at a central position of the support frame 16, and the rotating speed of the driving motor 15 is dynamically adjusted in combination with the amount of grid residue on the surface of the filtering module 200 and the actual residue scraping effect of the scrapers 12.

A left side of the inflow water guide plate 8 is fixedly connected to an extension plate of the water retaining platform 7, the inflow water guide plate 8 is disposed parallel to the first aperture screen plate area 9, and the inflow water guide plate 8 is disposed at an angle of 5-10°, where the water retaining platform 7 is fan-shaped, and the inflow water guide plate 8 is made of a plastic material.

As an implementation, the filtering module 200 is configured to arranged in a slightly curved surface, and the first aperture screen plate area 9 and the second aperture screen plate area 10 are both inclined downwards in the direction of the central water retaining weir 11, with an angle of 5-10° to the horizontal plane.

The area of the second aperture screen plate area 10 is 1-2 times the area of the first aperture screen plate area 9, the porosity of the first aperture screen plate area 9 and the second aperture screen plate area 10 is 80%-95%, the aperture range of the first aperture screen plate area 9 is 2-4 mm, and the aperture range of the second aperture screen plate area 10 is 0.2-2 mm.

As an implementation, both the first aperture screen plate area 9 and the second aperture screen plate area 10 are fan-shaped, and have the same radius of 25-75 cm. The specific radius is comprehensively determined based on the inflow water flow rates, screen plate apertures, porosity, and water flux.

The fan-shaped water retaining platform 7, the inflow water guide plate 8, the first aperture screen plate area 9, and the second aperture screen plate area 10 are disposed inside a barrel body of the cylindrical barrel 3 in a spliced manner so as to form a slightly curved surface with a central part protruding outwards, the central part is located below the outer circumference, and the outer circumference is seamlessly connected to the inner diameter of the barrel body.

An upper surface of the water retaining platform 7 is 10-15 cm higher than an upper surface of the second aperture screen plate area 10 located on the same circumference, and the area of the water retaining platform 7 accounts for $\frac{1}{12}$-$\frac{1}{8}$ of the area of the filtering module.

The scrapers 12 are arranged on a rotating shaft of the driving motor 15 in a manner of fan blade type combination, each of the scrapers includes a first layer structure 13 and a second layer structure 14, where the first layer structure 13 is located above the second layer structure 14, the first layer structure 13 is a hard stainless steel plate, and the second layer structure 14 is made of a soft material; the scrapers 12 are made of a composite material; the height of the first layer structure 13 is 30-40 cm, and an interstice between a tail end of the first layer structure and an inner wall of the grid body 1 is 1-2 cm; and the height of the second layer structure 14 is 15-20 cm, a tail end of the second layer structure is fully fitted to the inner wall of the grid body 1, and a bottom of the second layer structure 14 is fully fitted to the upper surfaces of the first aperture screen plate area 9 and the second aperture screen plate area 10. A piece of elastic rubber or a brush is employed as the second layer structure 14.

As an implementation, the scrapers 12 continuously rotate in a counterclockwise direction, and the rotating direction of the scrapers 12 is the same as the movement direction of effluent from the water distribution area 6 on the surfaces of the first aperture screen plate area 9 and the second aperture screen plate area 10.

The squeezing cylinder 19 passes through a center of the cylindrical barrel 3, and the length of a horizontal portion of the squeezing cylinder 19 is equal to the diameter of the cylindrical barrel 3.

The water discharge module 500 includes a conical catchment area 22 and the water outlet 23, and the water outlet 23 is reserved in a bottom of the conical catchment area 22.

The water intake module 100, the filtering module 200, the residue scraping module 300, the residue pressing module 400, and the water discharge module 500 of the grid body 1 are mainly made of 304 stainless steel material. The cylindrical barrel 3 of the grid body 1 is connected to the conical barrel 4 thereof in a welded or flanged manner.

The water inlet 5 is radially formed in the cylindrical barrel 3, and the sewage enters the water distribution area 6 from the water inlet 5. The sewage in the water distribution area 6 flows through the first aperture screen plate area 9 tangentially under the guide action of the inflow water guide plate 8, and then flows through the second aperture screen plate area 10 tangentially. The sewage filtration flux of the filtering module 200 can be further improved through the combination of cascade changes of the screen plate areas with different apertures. Under the combined action of the water retaining platform 7, the inflow water guide plate 8, the central water retaining weir 11, as well as the first aperture screen plate area 9 and the second aperture screen plate area 10 which are arranged in a slightly curved surface, the water flowing out of the water distribution area 6 sequentially flows through the first aperture screen plate area 9 and the second aperture screen plate area 10 uniformly along the counterclockwise direction of the circumference, thus realizing the adequate water distribution of the entire fan-shaped screen plate area; meanwhile, the scrapers 12 are driven by the driving motor 15 to rotate continuously counterclockwise, so that a large amount of fine particles, hair, and other grid residue in the sewage intercepted by the surfaces of the first aperture screen plate area 9 and the second aperture screen plate area 10 are continuously scraped to the fan-shaped residue inlet 17, and are enabled to fully adhere and rub with the guide rail 18 by ways of the second layer structures 14 of the scrapers 12; the grid residue is completely scraped into the fan-shaped residue inlet 17; the grid residue scraped into the squeezing cylinder 19 through the residue inlet 17 is discharged outside from the residue outlet 21 under the continuous rotation of the motor 20 after being fully squeezed; and the speed of the motor 20 can be flexibly adjusted according to the moisture content requirements for residue discharge. After being filtered by the first aperture screen plate area 9 and the second aperture screen plate area 10 of the filtering module 200, the sewage flows by gravity into the conical catchment area 22, and then flows out from the bottom water outlet 23 to a subsequent biological sewage treatment system.

Finally, it should be noted that the above specific implementations are only used to illustrate rather than to limit the technical solutions of the present disclosure. Although the present disclosure is described in detail with reference to examples, those of ordinary skill in the art should understand that modifications or equivalent substitutions made to the technical solutions of the present disclosure without departing from the spirit and scope of the technical solutions of the present disclosure shall be included in the scope of the claims of the present disclosure.

What is claimed is:

1. A grid system, comprising: a grid body (1) and supports (2), wherein the grid body (1) comprises a water intake module (100), a filtering module (200), a residue scraping module (300), a residue pressing module (400), and a water discharge module (500);
    the filtering module (200) is disposed at a middle-upper part of the grid body (1), the water intake module (100) and the residue pressing module (400) are coupled at a lower part of the filtering module (200), and the water intake module (100), the residue pressing module (400), the filtering module (200), and the residue scraping module (300) are located on a cylindrical barrel (3) disposed on the grid body (1);
    the water intake module (100) comprises a water inlet (5) and a water distribution area (6);
    the filtering module (200) is configured to be arranged on a slightly curved surface, and comprises a water retaining platform (7), an inflow water guide plate (8), a first aperture screen plate area (9), a second aperture screen plate area (10), and a central water retaining weir (11) located in a center of the filtering module (200), the first aperture screen plate area (9) and the second aperture screen plate area (10) are both inclined downwards in the direction of the central water retaining weir (11), with an angle of 5-10° to the horizontal plane;
    the residue scraping module (300) comprises scrapers (12), a driving motor (15), a support frame (16), a residue inlet (17), and a guide rail (18);
    the residue pressing module (400) comprises a squeezing cylinder (19), a motor (20), and a residue outlet (21);
    the water distribution area (6) is fitted to the lower part of the filtering module (200), a right side of the water distribution area (6) is aligned with a left side of the first aperture screen plate area (9), a left side of the water distribution area (6) is aligned with a right side of the water retaining platform (7), a left side of the water retaining platform (7) is coupled and integrated with the guide rail (18), the second aperture screen plate area (10) is formed between the first aperture screen plate area (9) and the residue inlet (17), and the squeezing cylinder (19) is connected to the residue inlet (17) by ways of grid residue baffles on both sides;
    the support frame (16) is disposed on the supports (2), the driving motor (15) is disposed on the support frame (16), and the scrapers (12) are driven by the driving motor (15) to rotate continuously;
    the residue outlet (21) is reserved at an outlet end of the squeezing cylinder (19), and the motor (20) and the residue outlet (21) are diagonally disposed on both sides of the cylindrical barrel (3); and
    the water discharge module (500) is disposed at a lower part of the grid body (1) and located on a conical barrel (4) disposed on the grid body (1), and a water outlet (23) is reserved in a bottom of the conical barrel (4).

2. The grid system according to claim 1, wherein a left side of the inflow water guide plate (8) is fixedly connected to an extension plate disposed on the water retaining platform (7), the inflow water guide plate (8) is disposed parallel to the first aperture screen plate area (9), and the inflow water guide plate (8) is disposed at an angle of 5-10°.

3. The grid system according to claim 1, wherein the area of the second aperture screen plate area (10) is 1-2 times the area of the first aperture screen plate area (9), the porosity of the first aperture screen plate area (9) and the second aperture screen plate area (10) is 80%-95%, the aperture range of the first aperture screen plate area (9) is 2-4 mm, and the aperture range of the second aperture screen plate area (10) is 0.2-2 mm.

4. The grid system according to claim 1, wherein the first aperture screen plate area (9) and the second aperture screen plate area (10) have the same radius of 25-75 cm.

5. The grid system according to claim 1, wherein an upper surface of the water retaining platform (7) is 10-15 cm higher than an upper surface of the second aperture screen plate area (10) located on the same circumference, and the area of the water retaining platform (7) accounts for 1/12-1/8 of the area of the filtering module (200).

6. The grid system according to claim 1, wherein the scrapers (12) are arc-shaped and arranged on the rotating shaft symmetrically in the plane of rotation, each of the scrapers comprises a first layer structure (13) and a second layer structure (14), the height of the first layer structure (13) is 30-40 cm, and an interstice between a tail end of the first layer structure and an inner wall of the grid body (1) is 1-2 cm; and the height of the second layer structure (14) is 15-20 cm, a tail end of the second layer structure is fitted to the inner wall of the grid body (1), and a bottom of the second layer structure (14) is fitted to the upper surfaces of the first aperture screen plate area (9) and the second aperture screen plate area (10).

7. The grid system according to claim 1, wherein the scrapers (12) continuously rotate in a counterclockwise direction, and the rotating direction of the scrapers (12) is the same as the movement direction of effluent from the water distribution area (6) on the surfaces of the first aperture screen plate area (9) and the second aperture screen plate area (10).

8. The grid system according to claim 1, wherein the squeezing cylinder (19) passes through a center of the cylindrical barrel (3), and a length of a horizontal portion of the squeezing cylinder (19) is equal to the diameter of the cylindrical barrel (3).

9. The grid system according to claim 1, wherein the water discharge module (500) comprises a conical catchment area (22) and the water outlet (23), and the water outlet (23) is reserved at a bottom of the conical catchment area (22).

* * * * *